United States Patent
Abe et al.

(10) Patent No.: US 10,604,992 B2
(45) Date of Patent: Mar. 31, 2020

(54) GLASS PANEL UNIT

(71) Applicant: Panasonic Intellectual Property Management Co., Ltd., Osaka (JP)

(72) Inventors: Hiroyuki Abe, Osaka (JP); Eiichi Uriu, Osaka (JP); Tasuku Ishibashi, Osaka (JP); Masataka Nonaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 79 days.

(21) Appl. No.: 15/755,286

(22) PCT Filed: Sep. 2, 2016

(86) PCT No.: PCT/JP2016/004012
§ 371 (c)(1),
(2) Date: Feb. 26, 2018

(87) PCT Pub. No.: WO2017/043059
PCT Pub. Date: Mar. 16, 2017

(65) Prior Publication Data
US 2018/0245397 A1    Aug. 30, 2018

(30) Foreign Application Priority Data
Sep. 8, 2015  (JP) .................................. 2015-176576

(51) Int. Cl.
*E06B 3/663* (2006.01)
*E06B 3/66* (2006.01)
(Continued)

(52) U.S. Cl.
CPC .......... *E06B 3/66304* (2013.01); *C03C 27/04* (2013.01); *E06B 3/66* (2013.01);
(Continued)

(58) Field of Classification Search
CPC .............. E06B 3/66304; E06B 3/6612; E06B 3/67334; E06B 3/66333; Y02B 80/22; Y02B 80/24; Y02A 30/25
See application file for complete search history.

(56) References Cited

U.S. PATENT DOCUMENTS 3,990,201 A * 11/1976 Falbel .................. E06B 3/6612
                                                    52/171.3
4,798,695 A *  1/1989 Redel ..................... B44F 1/066
                                                      156/107
(Continued)

FOREIGN PATENT DOCUMENTS

| CN | 201429374 Y  | 3/2010  |
|----|--------------|---------|
| JP | H10-297944 A | 11/1998 |
| JP | H11-310437 A | 11/1999 |
| JP | H11-311069 A | 11/1999 |
| JP | H11-324510 A | 11/1999 |
| JP | 2000-087656 A| 3/2000  |

(Continued)

OTHER PUBLICATIONS

International Search Report issued in Application No. PCT/JP2016/004012 dated Oct. 18, 2016, with English translation.

*Primary Examiner* — Donald J Loney
(74) *Attorney, Agent, or Firm* — McDermott Will & Emery LLP

(57) ABSTRACT

A glass panel unit includes a first pane of glass, and a second pane of glass facing the first pane of glass with both of them spaced a predetermined interval apart. It is provided with a sealant between the panes of glass, joined to them in an airtight manner, and an interior space sealed with them and the sealant. It is provided with a first spacer in the interior space so as to be in contact with the panes of glass, and a second spacer disposed in the interior space so as to be in contact with only one of the panes of glass and out of contact with another thereof.

12 Claims, 10 Drawing Sheets

(51) Int. Cl.
    *C03C 27/04*     (2006.01)
    *E06B 3/673*     (2006.01)
    *E06B 3/677*     (2006.01)
    *C03C 27/06*     (2006.01)
    *E06B 3/67*     (2006.01)

(52) U.S. Cl.
    CPC ........ *E06B 3/6612* (2013.01); *E06B 3/66333* (2013.01); *E06B 3/6775* (2013.01); *E06B 3/67334* (2013.01); *C03C 27/06* (2013.01); *E06B 3/6715* (2013.01); *E06B 2003/66338* (2013.01); *Y02A 30/25* (2018.01); *Y02B 80/22* (2013.01); *Y02B 80/24* (2013.01)

(56) References Cited

U.S. PATENT DOCUMENTS

| | | | | |
|---|---|---|---|---|
| 5,270,084 | A | * | 12/1993 | Parker .................... C03C 27/06 428/34 |
| 6,830,791 | B1 | | 12/2004 | Misonou et al. |
| 2009/0074997 | A1 | | 3/2009 | Stark |

FOREIGN PATENT DOCUMENTS

| | | | |
|---|---|---|---|
| JP | 2002-037647 | A | 2/2002 |
| JP | 2002-155215 | A | 5/2002 |
| TW | 400411 | B | 8/2000 |

\* cited by examiner

GLASS PANEL UNIT

RELATED APPLICATIONS

This application is the U.S. National Phase under 35 U.S.C. § 371 of International Application No. PCT/JP2016/004012, filed on Sep. 2, 2016, which in turn claims the benefit of Japanese Application No. 2015-176576, filed on Sep. 8, 2015, the disclosures of which are incorporated in their entirety by reference herein.

TECHNICAL FIELD

The invention relates to a glass panel unit.

BACKGROUND ART

Patent Document 1 discloses an insulating glass. The insulating glass described in Patent Document 1 includes a first pane of glass, a second pane of glass facing the first pane of glass, and a sealant that is joined to the first pane of glass and the second pane of glass in an airtight manner. The insulating glass further includes spacers that are disposed within an interior space as a vacuum space sealed with the first pane of glass, the second pane of glass and the sealant and that are in contact with the first pane of glass and the second pane of glass.

Although the first pane of glass and the second pane of glass under atmospheric pressure have a tendency to bend in a direction approaching each other, the spacers maintain the interior space by touching both the first pane of glass and the second pane of glass having the tendency to bend.

CITATION LIST

Patent Literature

Patent Document 1: JP H11-311069 A

SUMMARY OF INVENTION

The insulating glass shown in Patent Document 1 has a tendency for the first pane of glass and the second pane of glass to be easily broken on impact when a pane surface thereof receives an impact force.

It is an object of the present invention to obtain a glass panel unit having high impact resistance.

A glass panel unit according to an aspect of the present invention includes a first pane of glass, a second pane of glass, a sealant, an interior space, a first spacer and a second spacer. The second pane of glass faces the first pane of glass with the first pane of glass and the second pane of glass spaced a predetermined interval apart. The sealant is disposed between the first pane of glass and the second pane of glass and joined to the first pane of glass and the second pane of glass in an airtight manner. The interior space is sealed with the first pane of glass, the second pane of glass and the sealant. The first spacer is disposed in the interior space with the first spacer being in contact with the first pane of glass and the second pane of glass. The second spacer is disposed in the interior space so as to be in contact with only one of the first pane of glass and the second pane of glass and out of contact with another thereof.

DESCRIPTION OF EMBODIMENTS

A first embodiment relates to a glass panel unit and, more particularly, to a glass panel unit including a first pane of glass, a second pane of glass, and a sealant joined to them in an airtight manner, which form a vacuum interior space.

Figure 1:
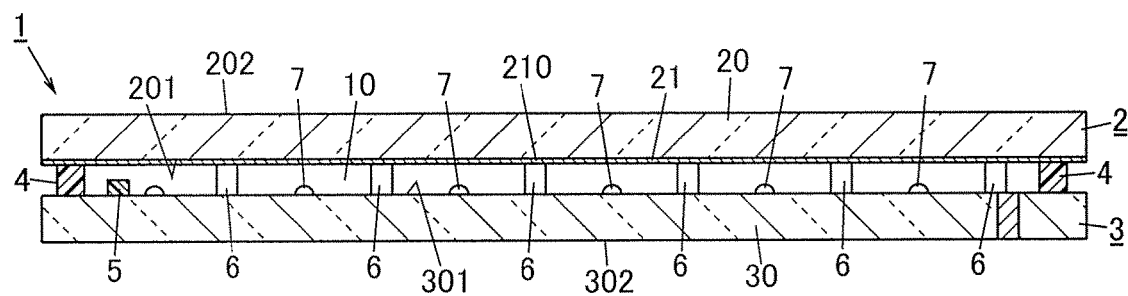
FIG. 1 is a schematic sectional view of a glass panel unit according to a first embodiment of the present invention.
Figure 2:
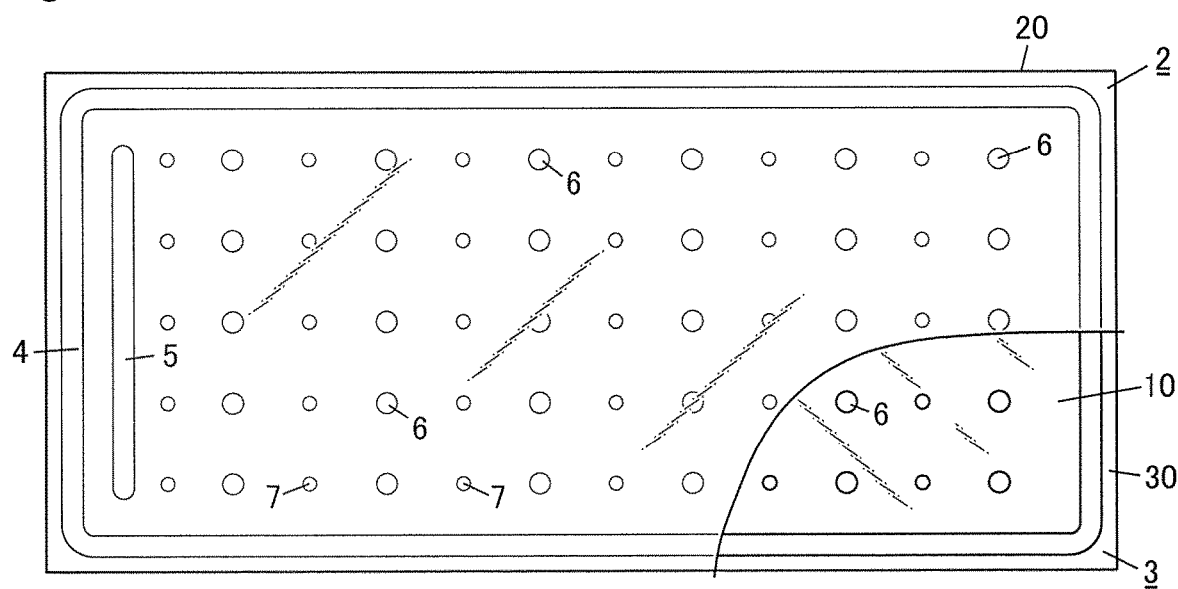
FIG. 2 is a schematic plan of the glass panel unit according to the first embodiment.

FIGS. 1 and 2 show a glass panel unit 1 according to the first embodiment. The glass panel unit 1 according to the first embodiment is a vacuum insulated glazing unit. The vacuum insulated glazing unit is a kind of insulating glass including at least two panes of glass that are paired.

The glass panel unit 1 according to the first embodiment includes a first pane of glass 2, a second pane of glass 3, a sealant 4, an interior space 10, a gas adsorbent 5, first spacers 6 and second spacers 7.

As shown in FIGS. 1 and 2, the first pane of glass 2 includes a plate glass—a first plate glass 20 defining a plane form of the first pane of glass 2, and a coating 21.

The first plate glass 20 is a flat rectangular plate and has a first surface 201 and a second surface 202 that are parallel to each other on both sides of a thickness direction of the first plate glass 20. Each of the first and second surfaces 201 and 202 of the first plate glass 20 is a plane. Examples of material of the first plate glass 20 include, but not particularly limited to, soda lime glass, high strain point glass, chemically toughened glass, non-alkali glass, silica glass, Neoceram, and thermally toughened glass.

The coating 21 is formed on the first surface 201 of the first plate glass 20. The coating 21 is a low-e, namely a low-emissivity film 210 such as an infrared reflection film. Note that the coating 21 is not limited to the low-emissivity film 210, but may be a film having specific physical property.

The second pane of glass 3 includes a plate glass—a second plate glass 30 defining a plane form of the second pane of glass 3. The second plate glass 30 is a flat rectangular plate and has a first surface 301 and a second surface 302 that are parallel to each other on both sides of a thickness direction of the second plate glass 30. Each of the first and second surfaces 301 and 302 of the second plate glass 30 is a plane.

The plane form and plane size of the second plate glass 30 are the same as those of the first plate glass 20. The thickness of the second plate glass 30 is the same as that of the first plate glass 20. Examples of material of the second plate glass 30 include, but not particularly limited to, soda lime glass, high strain point glass, chemically toughened glass, non-alkali glass, silica glass, Neoceram, and thermally toughened glass.

As shown in FIGS. 1 and 2, the second pane of glass 3 is composed of only the second plate glass 30. That is, the second pane of glass 3 is formed with no coating unlike the coating 21. The second plate glass 30 alone forms the second pane of glass 3. The first pane of glass 2 and the second pane of glass 3 differ from each other only in that the first pane of glass 2 is formed with the coating 21, whereas the second pane of glass 3 is formed with no coating unlike the coating 21.

The second pane of glass 3 faces the first pane of glass 2 with the first pane of glass 2 and the second pane of glass 3 spaced a predetermined interval apart. Specifically, the first pane of glass 2 and the second pane of glass 3 are arranged so that the first surface 201 of the first pane of glass 2 and the first surface 301 of the second pane of glass 3 are parallel to and face each other with the predetermined interval. Moreover, as viewed along a direction perpendicular to a pane surface (first surface 201 of first plate glass 20 and first surface 301 of second plate glass 30), they are arranged so that an outline of the first plate glass 20 accords with an outline of the second plate glass 30.

As shown in FIGS. 1 and 2, the sealant 4 is disposed between the first pane of glass 2 and the second pane of glass 3 and joined to the first pane of glass 2 and the second pane of glass 3 in an airtight manner. Consequently, the interior space 10 encompassed with the first pane of glass 2, the second pane of glass 3 and the sealant 4 is formed.

The sealant 4 is made from thermal bonding material. The thermal bonding material is, for example glass frit. The glass frit is, for example low melting point glass frit having a specific softening point (softening temperature). Examples of the low melting point glass frit include bismuth-based glass frit, lead-based glass frit, and vanadium-based glass frit.

The sealant 4 is frame rectangular in shape. As viewed along the direction perpendicular to the pane surface of the glass panel unit 1, an outline form of the sealant 4 is almost the same as outline forms of the first plate glass 20 and the second plate glass 30, but the actual outline form of the sealant 4 is smaller than each of the outline forms of the first plate glass 20 and the second plate glass 30. The sealant 4 is formed along respective peripheries of the first plate glass 20 and the second plate glass 30. That is, the sealant 4 is formed to surround almost every region of the space between the first plate glass 20 and the second plate glass 30.

As shown in FIGS. 1 and 2, the gas adsorbent 5 is disposed in the interior space 10 encompassed with the first pane of glass 2, the second pane of glass 3, and the sealant 4. The gas adsorbent 5 is provided for adsorbing unnecessary gas—residual gas. Examples of the unnecessary gas include gas discharged from the sealant 4 when the sealant 4 is heated.

The gas adsorbent 5 has a getter. The getter is adsorbent material for adsorbing molecules whose size is smaller than a specific size. The getter is, for example an evaporation type getter. The evaporation type getter has a property capable of discharging adsorbed molecules at a temperature higher than or equal to the activation temperature. Examples of the evaporation type getter include zeolite, and ion-exchanged zeolite—e.g., copper ion exchanged zeolite.

The interior space 10 is a space from which air is released. In other words, the interior space 10 is a vacuum space, or a decompressed space whose degree of vacuum is a predetermined value or less. The predetermined value is, for example 0.1 [Pa]. However, the predetermined value is not limited to 0.1 [Pa].

As shown in FIGS. 1 and 2, the first spacers 6 are provided for maintaining the interval between the first pane of glass 2 and the second pane of glass 3 at a predetermined interval. Since the interior space 10 is the vacuum space or the decompressed space in particular, the first pane of glass 2 and the second pane of glass 3 under atmospheric pressure on the second surface 202 and the second surface 302 have a tendency to bend in a direction approaching each other. The first spacers 6 keep the interior space 10 by supporting the first pane of glass 2 and the second pane of glass 3 having the tendency to bend.

The first spacers 6 are disposed in the interior space 10. Specifically, the first spacers 6 are disposed at respective vertices of a virtual rectangular grid. The first spacers 6 are in contact with both the first pane of glass 2 and the second pane of glass 3 even when the first pane of glass 2 and the second pane of glass 3 receive no force other than atmospheric pressure.

Each interval of the first spacers 6 is, for example 2 cm. Note that respective sizes, forms and intervals of the first spacers 6, and the number of and an arrangement pattern of the first spacers 6 may be selected appropriately.

The first spacers 6 are made from transparent material. Note that the first spacers 6 may be made from opaque material as long as they are sufficiently small.

The material to be selected for the first spacers 6 has a tendency not to be changed at a softening point of the thermal bonding material forming the sealant 4.

Each of the first spacers 6 is cylindrical in shape and has a height that is almost the same as the interval between the first surface 201 of the first pane of glass 2 and the first surface 301 of the second pane of glass 3. For example, each of the first spacers 6 is 1 mm in diameter and 100 μm in height. Note that each of the first spacers 6 may have one of other shapes such as a rectangular column and a spherical shape.

A term of "a basic glass panel unit 1A" is used for the sake of convenience in place of a glass panel unit 1 that includes a first pane of glass 2, a second pane of glass 3, a sealant 4, an interior space 10, a gas adsorbent 5 and first spacers 6 as stated above but does not include second spacers 7 to be described later.

In general glass panels, the resistance to an impact force on the pane surface (hereinafter referred to as "impact resistance") is one of important factors. With the above basic glass panel unit 1A, the first spacers 6 is one of factors defining the impact resistance.

The first spacers 6 have factors to be selected appropriately such as their sizes and each interval between each adjoining first spacers 6, as stated above. Above all, a ratio of a total area of the first spacers 6 to an area of a pane surface of the first pane of glass 2 and the second pane of glass 3 (hereinafter referred to as an "area ratio $r_1$") is one of large factors determining the impact resistance of the basic glass panel unit 1A. Here, respective areas of the first spacers 6 are respective areas of the first spacers 6 as viewed along a direction perpendicular to the pane surface of the first pane of glass 2 and the second pane of glass 3. The developer of the glass panel unit 1 performed drop tests 1 to 6 for finding a relationship between area ratios $r_1$ and respective impact resistance. The drop tests 1 to 6 will hereinafter be explained.

In the drop tests 1 to 6, different kinds of basic glass panel units 1A that their respective first spacers 6 have area ratios $r_1$ different from each other were prepared.

Figure 3A:
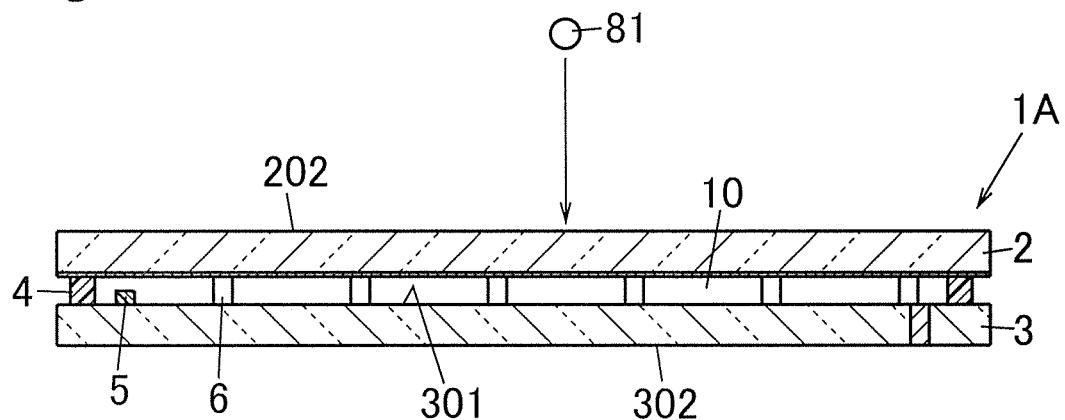
FIG. 3A is a schematic sectional view illustrating drop tests 1, 3 and 5.
Figure 3B:
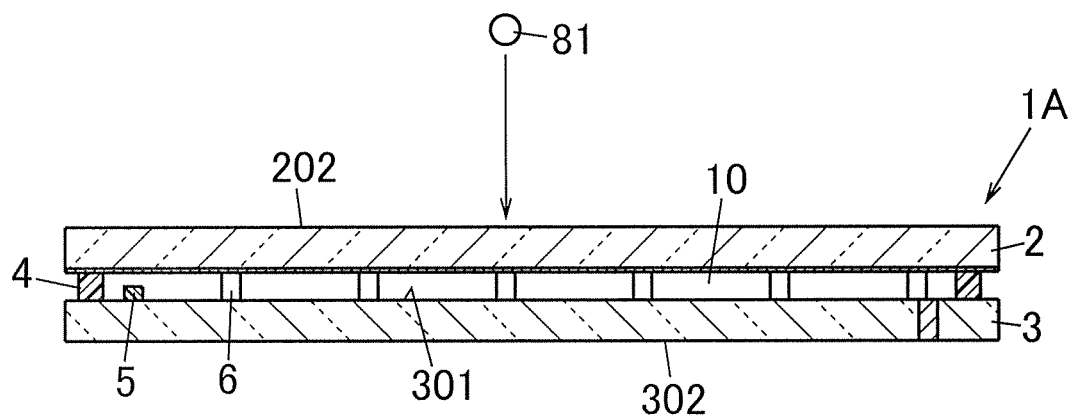
FIG. 3B is a schematic sectional view illustrating drop tests 2, 4 and 6.

As shown in FIGS. 3A and 3B, each basic glass panel units 1A was placed on a surface table with a side of the second surface 202 of the first pane of glass 2 up.

A steel ball 81 that is 225 g in weight was dropped on the second surface 202 of each first pane of glass 2 from a stop position at a height.

The steel ball 81 freely falling hit the second surface 202 of the first pane of glass 2 placed below.

The drop test was performed by allowing the steel ball 81 to freely fall from a height to hit the second surface 202 of the first pane of glass 2, while increasing the height from a lower height every free fall.

When the basic glass panel unit 1A was broken as a result of the steel ball 81 freely falling from a height (hereinafter referred to a "drop height") to hit the second surface 202 of the first pane of glass 2, the drop height was regarded as the impact resistance. It can be considered that higher drop height represents higher impact resistance.

Each of the basic glass panel units 1A in the drop tests 1 to 6 included first spacers 6 each of which has the same area $s_{10}$. Accordingly, a total area $s_1$ of the whole first spacers 6 was calculated by multiplying an area $s_{10}$ per first spacer 6 and the number of the first spacers 6, n. The area ratio $r_1$ was calculated by dividing the area $s_1$ by an area S of the pane surface.

In all the drop tests 1 to 6, the first pane of glass 2, the second pane of glass 3, the sealant 4 and the gas adsorbent 5 exclusive of the first spacers 6 were in the same state. In all the drop tests 1 to 6, the first spacers 6 were the same as each other. In each of the drop tests 1 to 6, respective intervals between respective adjoining first spacers 6 in a lengthwise direction and a widthwise direction were the same as each other.

In the drop tests 1 and 2, each first spacer 6 was about 0.5 mm in diameter, each interval of each adjoining first spacers 6 was 20 mm, and the area ratio n was 0.05%.

As shown in FIG. 3A, the drop test 1 was performed such that the steel ball 81 hit a place of the second surface 202 of the first pane of glass 2 between two adjoining first spacers 6, and the drop height was 30 cm.

As shown in FIG. 3B, the drop test 2 was performed such that the steel ball 81 hit a place of the second surface 202 of the first pane of glass 2 on the position of a first spacer 6, and the drop height was 55 cm.

In the drop tests 3 and 4, each first spacer 6 was about 0.65 mm in diameter, each interval of each adjoining first spacers 6 was 20 mm, and the area ratio $r_1$ was 0.083%.

As shown in FIG. 3A, the drop test 3 was performed such that the steel ball 81 hit a place of the second surface 202 of the first pane of glass 2 between two adjoining first spacers 6, and the drop height was 46 cm.

As shown in FIG. 3B, the drop test 4 was performed such that the steel ball 81 hit a place of the second surface 202 of the first pane of glass 2 on the position of a first spacer 6, and the drop height was 55 cm.

In the drop tests 5 and 6, each first spacer 6 was about 0.5 mm in diameter, each interval of each adjoining first spacers 6 was 14 mm, and the area ratio $r_1$ was 0.10%.

As shown in FIG. 3A, the drop test 5 was performed such that the steel ball 81 hit a place of the second surface 202 of the first pane of glass 2 between two adjoining first spacers 6, and the drop height was 50 cm.

As shown in FIG. 3B, the drop test 6 was performed such that the steel ball 81 hit a place of the second surface 202 of the first pane of glass 2 on the position of a first spacer 6, and the drop height was 55 cm.

Figure 4:
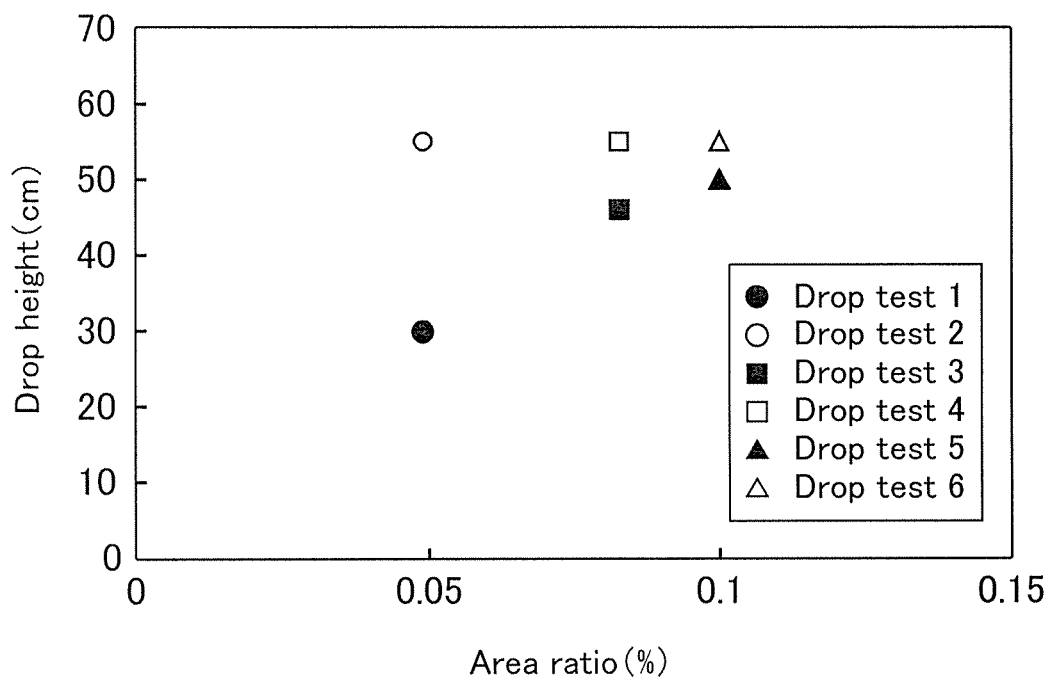
FIG. 4 is a graph showing results of the drop tests 1 to 6.

FIG. 4 shows the test results of the drop tests 1 to 6.

From the drop tests 1, 3 and 5, it is confirmed that the drop height depends on the area ratio $r_1$ when the steel ball 81 hits a place of the second surface 202 of the first pane of glass 2 between two adjoining first spacers 6. That is, the results obtained from the drop tests 1 and 3 show that when respective intervals of the first spacers 6 are the same as each other and respective diameters of the first spacers 6 are changed, the drop height changes. In short, the drop height depends on the area ratio $r_1$ and the obtained results show that the drop height more increases as the area ratio $r_1$ more increases.

From the drop tests 2, 4 and 6, it is confirmed that the drop height as the impact resistance has the same value without depending on the area ratio $r_1$ when the steel ball 81 hits a place of the second surface 202 of the first pane of glass 2 on the position of a first spacer 6.

The results also show that the respective drop heights in the drop tests 1, 3 and 5 are lower than the respective drop heights in the drop tests 2, 4 and 6, and namely their respective impact resistance is low.

In the drop tests 1, 3 and 5, when the steel ball 81 hits the second surface 202 of the first pane of glass 2 to break the basic glass panel unit 1A, the first pane of glass 2 is first bent with the first pane of glass 2 supported by two adjoining first spacers 6 at both sides of the place hit by the steel ball 81. The bent first pane of glass 2 then hits or comes into contact with the unbent second pane of glass 3. The breakage such as crack occurs at the place where the first pane of glass 2 hits the second pane of glass 3, and the breakage will advance from the place as an origin in first pane of glass 2, the second pane of glass 3 or both of them. It is considered that the breakage of each basic glass panel unit 1A in the drop tests 1, 3 and 5 would have occurred as stated above.

In the drop tests 2, 4 and 6, when the steel ball 81 hits the second surface 202 of the first pane of glass 2 to break the basic glass panel unit 1A, the first pane of glass 2 is hardly bent unlike the drop tests 1, 3 and 5. Therefore, the breakage as a result of the first pane of glass 2 bent hitting the second pane of glass 3 hardly occurs. Instead, part of the first pane of glass 2 is nipped between the steel ball 81 and the first spacer 6 in an impacted manner, and consequently the breakage occurs at the nipped part. It is considered that the breakage of each basic glass panel unit 1A in the drop tests 2, 4 and 6 would have occurred as stated above.

From the drop tests 2, 4 and 6, it is considered that when the steel ball 81 hits a place of the second surface 202 of the first pane of glass 2 on the position of a first spacer 6 to break the basic glass panel unit 1A, the drop height largely depends on mainly an attribute of the first pane of glass 2. Therefore, heightening the drop height to enhance the impact resistance in the drop tests 2, 4 and 6 requires modifying the attribute of the first pane of glass 2 itself—improving breaking strength.

From test results shown in FIG. 4, it is understood that when the steel ball 81 hits a place of the second surface 202 of the first pane of glass 2 between two adjoining first spacers 6 like the drop tests 1, 3 and 5, the impact resistance is enhanced by increasing the area ratio $r_1$ of the first spacers 6 to heighten the drop height. That is, it is possible to enhance the impact resistance by increasing the area ratio $r_1$ of the first spacers 6 without changing the attribute of the first pane of glass 2 itself. In this case, the improvement of the impact resistance is not effective when the steel ball 81 hits a place of the second surface 202 of the first pane of glass 2 on the position of a first spacer 6. However, the improvement of the impact resistance is efficiently available because the area ratio $r_1$ of the first spacers 6 is about less than 0.2%.

There is however an issue that increasing the area ratio $r_1$ of the first spacers 6 will cause reduction in thermal insulation efficiency of the basic glass panel unit 1A. That is, each of the first spacers 6 in contact with both the first pane of glass 2 and the second pane of glass 3 allows heat to be transmitted between the first pane of glass 2 and the second pane of glass 3 via the first spacers 6. As each cross-sectional area of the first spacers 6 perpendicular to a heat propagation direction is more increased—namely, the area ratio $r_1$ is more increased, more heat is transmitted between the first pane of glass 2 and the second pane of glass 3, thereby reducing the thermal insulation efficiency. Therefore, the second spacers 7 are provided in order to enhance the impact resistance without increasing the area ratio $r_1$ of the first spacers 6—namely without reducing the thermal insulation efficiency.

As shown in FIGS. 1 and 2, the second spacers 7 are disposed in the interior space 10 so as to be in contact with only one of the first pane of glass 2 and the second pane of glass 3 and out of contact with another thereof. Specifically, when the first pane of glass 2 and the second pane of glass 3 receive no force other than atmospheric pressure, the second spacers 7 are not in contact with both the first pane of glass 2 and the second pane of glass 3, but in contact with only one of them, unlike the first spacers 6. That is, each of the second spacers 7 has a thickness that is shorter than a distance between the first pane of glass 2 and the second pane of glass 3 when they receive no force other than atmospheric pressure. Note that respective thicknesses of the second spacers 7 are not particularly limited as long as the thicknesses are shorter than the distance between the first pane of glass 2 and the second pane of glass 3 when they receive no force other than atmospheric pressure.

Thus, since the second spacers 7 are disposed so as to be in contact with only one of the first pane of glass 2 and the second pane of glass 3 and out of contact with another thereof, no heat is transmitted between the first pane of glass 2 and the second pane of glass 3 via the second spacers 7. It is therefore possible to suppress reduction in thermal insulation efficiency caused by heat transmission via the second spacers 7 of the glass panel unit 1.

The second spacers 7 are arranged in the interior space 10. Specifically, one or more second spacers 7 are arranged between each two or more first spacers 6 in the interior space 10. The second spacers 7 are fixed to the second pane of glass 3 with the second spacers 7 being in contact with the second pane of glass 3. The second spacers 7 are out of contact with the first pane of glass 2 when the first pane of glass 2 and the second pane of glass 3 receive no force other than atmospheric pressure.

In the first embodiment, each of the second spacers 7 is composed of a granular material that is 100 μm or less in maximum length in a horizontal direction. The granular material forming each second spacer 7 may be composed of an elastic body. Note that each of the second spacers 7 need not necessarily be composed of the elastic body. The second spacers 7 are arranged regularly in the first embodiment. Note that respective sizes and intervals of the second spacers 7, and the number of and an arrangement pattern of the second spacers 7 may be selected appropriately.

The second spacers 7 are made from transparent material.

The material to be selected for the second spacers 7 has a softening point (softening temperature) higher than a softening point of the thermal bonding material forming the sealant 4.

A schematic example of a production method for the glass panel unit 1 according to the abovementioned first embodiment will hereinafter be explained with reference to FIGS. 5 to 7.

The production method for the glass panel unit 1 includes producing an assembly 100 whose interior space 102 is not sealed, and producing the glass panel unit 1 as a finished product by sealing the interior space 102 of the assembly 100 with the interior space 102 being in a vacuum state.

In order to produce the assembly 100, first producing the first plate glass 20 and the second plate glass 30 is performed.

Forming the coating 21 on the first surface 201 of the first plate glass 20 to form the first pane of glass 2 is then performed.

Forming an air release vent 101 in the second pane of glass 3 composed of the second plate glass 30 is then performed. Note that the air release vent 101 may be formed in the first pane of glass 2.

Disposing thermal bonding material 40 around the periphery of the first surface 301 of the second pane of glass 3 is then performed, where the thermal bonding material 40 is annular in shape and is to be provided as the sealant 4.

Figure 5:
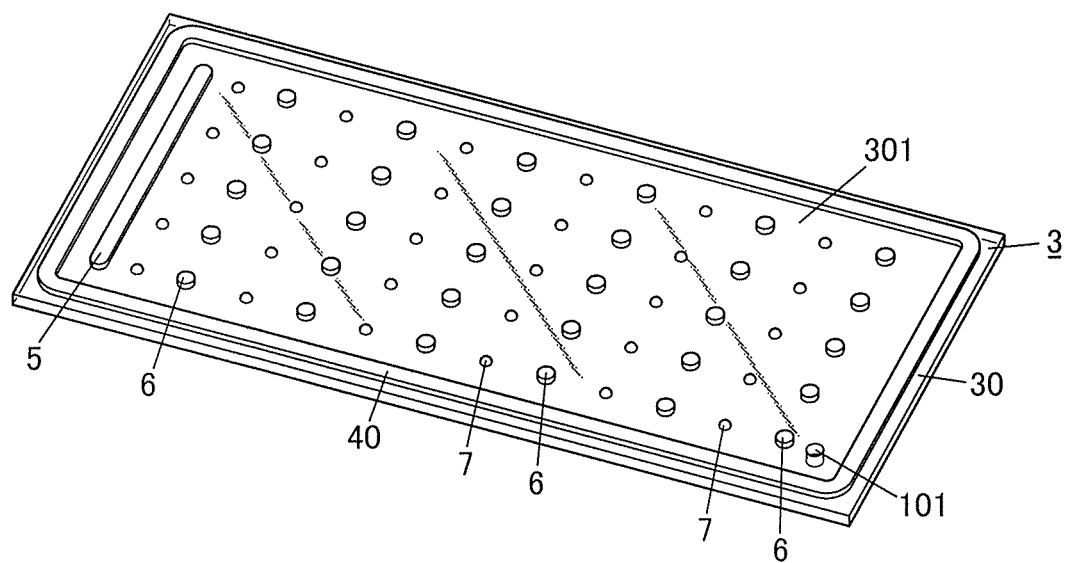
FIG. 5 illustrates a production method of the glass panel unit according to the first embodiment.

As shown in FIG. 5, arranging the gas adsorbent 5, the first spacers 6 and the second spacers 7 inside the annular thermal bonding material 40 disposed on the first surface 301 of the second pane of glass 3 is then performed.

Figure 6:
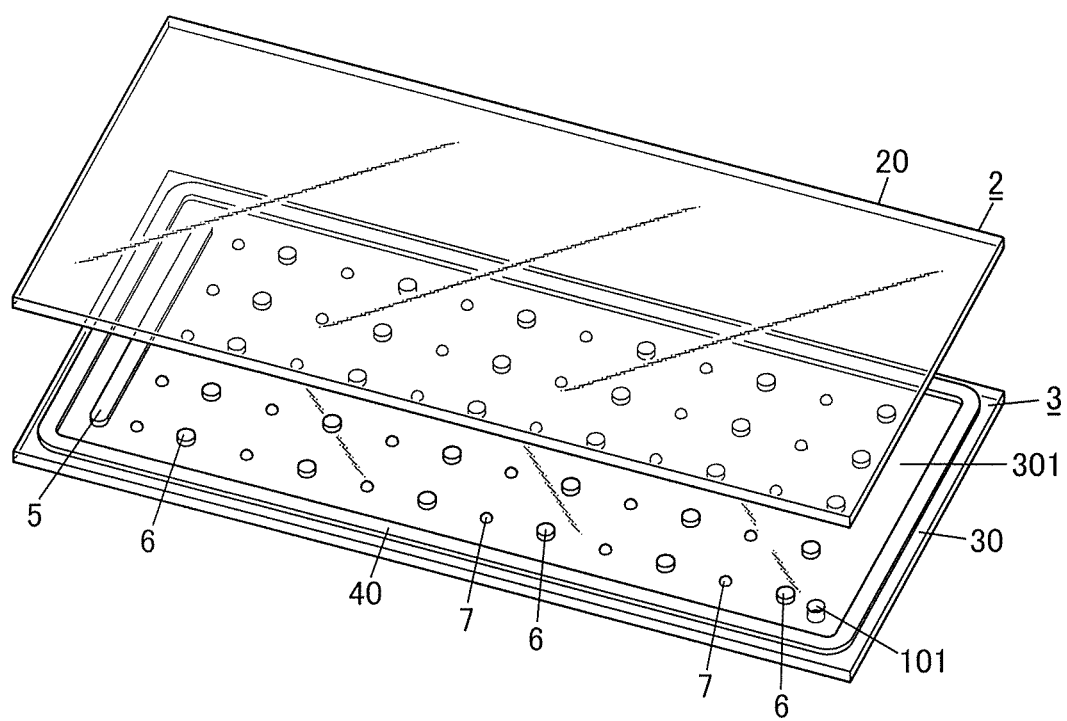
FIG. 6 illustrates the production method of the glass panel unit according to the first embodiment.

As shown in FIG. 6, mounting the first pane of glass 2 on the thermal bonding material 40 on the second pane of glass 3 to stack the first pane of glass 2 on the second pane of glass 3 is then performed.

Figure 7:
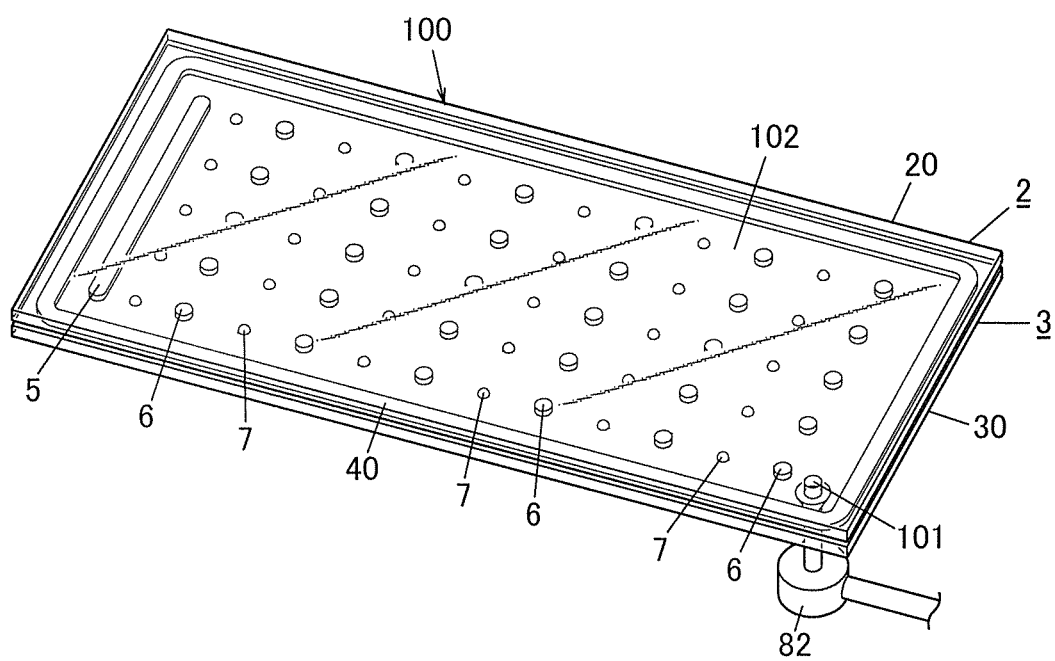
FIG. 7 illustrates the production method of the glass panel unit according to the first embodiment.

Thus, the assembly 100 shown in FIG. 7 is produced. Subsequently, sealing the interior space 102 of the assembly 100 with the interior space 102 being in a vacuum state to produce the glass panel unit 1 as a finished product is performed.

In order to produce the glass panel unit 1 as the finished product, first heating the assembly 100 is performed. In this case, the heating is performed so that the temperature of the thermal bonding material 40 is higher than or equal to the softening temperature of the thermal bonding material 40. Accordingly, the thermal bonding material 40 is melted once, and joined to the first pane of glass 2 and the second pane of glass 3 in an airtight manner. The thermal bonding material 40 melted once is cooled to harden, thereby functioning as the sealant 4.

As shown in FIG. 7, releasing air from the interior space 102 through the air release vent 101 formed in the second pane of glass 3 with a vacuum pump 82 is then performed.

Sealing the air release vent 101 formed in the second pane of glass 3 to seal the interior space 102 is then performed.

Thus, the glass panel unit 1 as the finished product is produced.

Note that the production method of the glass panel unit 1 stated above is merely one example and the embodiment is not particularly limited to this.

Improvement in the impact resistance of the glass panel unit 1 by providing the second spacers 7 on the glass panel unit 1 will hereinafter be explained.

A stated above, the second spacers 7 have some factors to be selected appropriately, such as respective sizes and each interval between each adjoining second spacers 7. Above all, a ratio of a total area of the second spacers 7 to an area of a pane surface of the first pane of glass 2 and the second pane of glass 3 (hereinafter referred to as an "area ratio $r_2$") is one of large factors determining the impact resistance of the glass panel unit 1 like the first spacers 6. Here, each area of the second spacers 7 is an area of a corresponding second spacer 7 as viewed along the direction perpendicular to the pane surface of the first pane of glass 2 and the second pane of glass 3. The developer of the glass panel unit 1 performed drop tests 11 to 16 for finding a relationship between area ratios $r_2$ and respective impact resistance. The drop tests 11 to 16 will hereinafter be explained.

In the drop tests 11 to 16, different kinds of glass panel units 1 that their respective second spacers 7 have area ratios $r_2$ different from each other were prepared.

The drop tests 11 to 16 were performed in the same manner as the drop tests 1 to 6.

That is, each glass panel unit 1 was placed on the surface table with a side of the second surface 202 of the first pane of glass 2 up. The steel ball 81 that is 225 g in weight (see FIG. 3A) was dropped freely on the second surface 202 of each first pane of glass 2 from a stop position at a height. The steel ball 81 freely falling hit the second surface 202 of the first pane of glass 2 placed below. The drop test was performed by allowing the steel ball 81 to freely fall from a height to hit the second surface 202 of the first pane of glass 2, while increasing the height from a lower height every free fall. When the glass panel unit 1 was broken as a result of the steel ball 81 freely falling from a drop height to hit the second surface 202 of the first pane of glass 2, the drop height was regarded as the impact resistance.

In all the drop tests 11 to 16, the first pane of glass 2, the second pane of glass 3, the sealant 4, the gas adsorbent 5 and the first spacers 6 exclusive of the second spacers 7 were in the same state. The first spacers 6 were the same as those in the drop tests 1 to 6. That is, in the drop tests 11 to 16, each first spacer 6 was about 0.5 mm in diameter, each interval was 20 mm, and the area ratio $r_1$ was 0.05% like the basic glass panel unit 1A in the drop tests 1 and 2, while the second spacers 7 were provided according to respective conditions of the drop tests 11 to 16.

In the drop tests 11 and 12, the area ratio $r_2$ of the second spacers 7 was 0%, namely no second spacer 7 is provided. In short, the drop test 11 is the same as the drop test 1, and the drop test 12 is the same as the drop test 2.

The drop test 11 was performed such that the steel ball 81 hit a place of the second surface 202 of the first pane of glass 2 between two adjoining first spacers 6, and the drop height was 30 cm like the drop test 1.

The drop test 12 was performed such that the steel ball 81 hit a place of the second surface 202 of the first pane of glass 2 on the position of a first spacer 6, and the drop height was 55 cm like the drop test 2.

The area ratio $r_2$ of the second spacers 7 in each of the drop tests 13 and 14 was 0.05%.

The drop test 13 was performed such that the steel ball 81 hit a place of the second surface 202 of the first pane of glass 2 between two adjoining first spacers 6, and the drop height was 40 cm.

The drop test 14 was performed such that the steel ball 81 hit a place of the second surface 202 of the first pane of glass 2 on the position of a first spacer 6, and the drop height was 55 cm.

The area ratio $r_2$ of the second spacers 7 in each of the drop tests 15 and 16 was 0.15%.

The drop test 15 was performed such that the steel ball 81 hit a place of the second surface 202 of the first pane of glass 2 between two adjoining first spacers 6, and the drop height was 70 cm.

The drop test 16 was performed such that the steel ball 81 hit a place of the second surface 202 of the first pane of glass 2 on the position of a first spacer 6, and the drop height was 55 cm.

Figure 8:
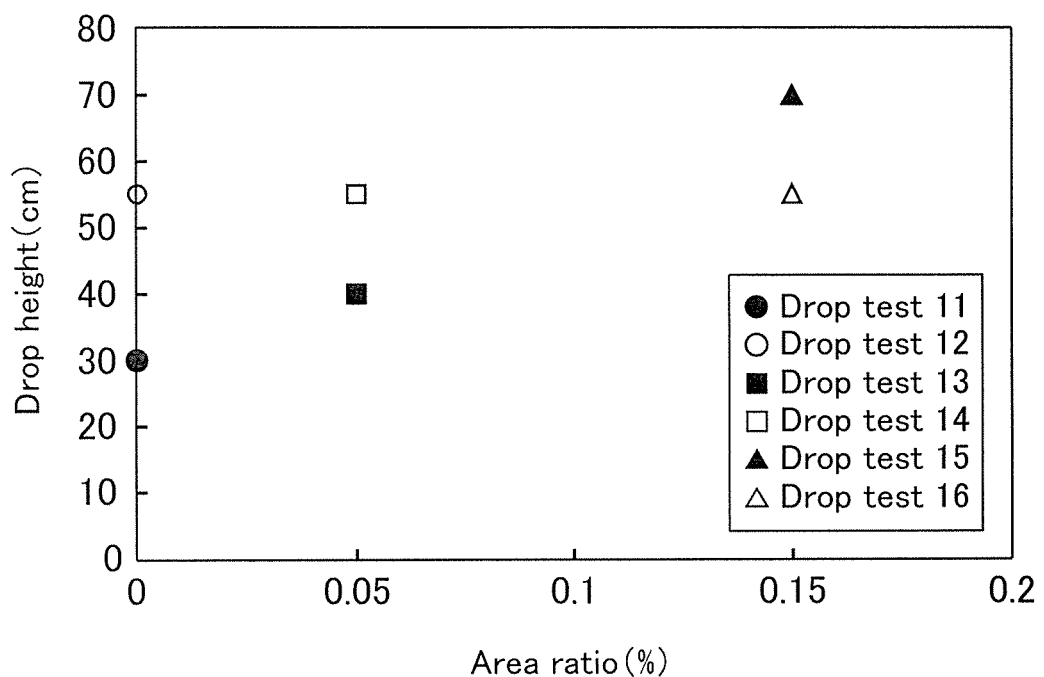
FIG. 8 is a graph showing results of the drop tests 11 to 16.

FIG. 8 shows the test results of the drop tests 11 to 16.

From the drop tests 11, 13 and 15, it is confirmed that the drop height depends on the area ratio $r_2$ when the steel ball 81 hits a place of the second surface 202 of the first pane of glass 2 between two adjoining first spacers 6.

From the drop tests 12, 14 and 16, it is confirmed that like the drop tests 2, 4 and 6, the drop height has the same value without depending on the area ratio $r_2$ when the steel ball 81 hits a place of the second surface 202 of the first pane of glass 2 on the position of a first spacer 6. Like the drop tests 2, 4 and 6, it is considered that part of the first pane of glass 2 is nipped between the steel ball 81 and the first spacer 6 in an impacted manner, and consequently the breakage occurs at the nipped part.

Even in the drop tests 11, 13 and 15 like the drop tests 1, 3 and 5, the first pane of glass 2 is first bent with the first pane of glass 2 supported by two adjoining first spacers 6 at both sides of the place hit by the steel ball 81. It is considered that the bent first pane of glass 2 hits the second pane of glass 3 and then the glass panel unit 1 is broken.

However, in the drop test 13 and 15, the second spacers 7 were provided unlike the drop tests 1, 3 and 5. It is considered that the bent first pane of glass 2 comes into contact with the second spacers 7 but does not directly hit the second pane of glass 3. It is alternatively considered that the bent first pane of glass 2 directly hits the second pane of glass 3 but the second spacers 7 absorb the shock to a certain degree. In either case, the impact force caused by direct or indirect impact between the first pane of glass 2 and the second pane of glass 3 is reduced when compared with no second spacer 7. It is therefore considered that the glass panel unit 1 is hardly broken.

The drop test 15 especially shows a high impact resistance result by a high drop height when compared with the drop test 16 in which the steel ball 81 hit the place of the second surface 202 of the first pane of glass 2 on the position of the first spacer 6. This may be because the first pane of glass 2 is bent and thereby the impact energy of the steel ball 81 onto the first pane of glass 2 is used as deformation energy of the first pane of glass 2 (hereinafter referred to as attenuation energy) but hardly used as breakage energy of the first pane of glass 2.

When the steel ball 81 hits a place of the second surface 202 of the first pane of glass 2 between two adjoining first spacers 6 like the drop tests 11, 13 and 15, it is understood from the test results shown in FIG. 8 that increasing the area ratio $r_2$ of the second spacers 7 causes heightening the drop height, thereby enhancing the impact resistance. That is, increasing the area ratio $r_2$ of the second spacers 7 enables enhancing the impact resistance without changing the attribute of the first pane of glass 2 itself.

Even if the area ratio $r_2$ of the second spacers 7 is increased, the thermal insulation efficiency of the glass panel unit 1 is hardly reduced. This is because when the glass panel unit 1 receives no force other than atmospheric pressure, no heat is transmitted between the first pane of glass 2 and the second pane of glass 3 via the second spacers 7 as a result of the second spacers 7 being in contact with only the second pane of glass 3 but out of contact with the first pane of glass 2.

When the first pane of glass 2 and the second pane of glass 3 are bent and the second spacers 7 come into contact with both of them, heat is transmitted between the first pane of glass 2 and the second pane of glass 3 via the second spacers 7. It is however considered that when the first pane of glass 2 and the second pane of glass 3 receive not constant force but impact force, the first pane of glass 2 and the second pane of glass 3 are bent such that the second spacers 7 come into contact with both of them. Time in which the first pane of glass 2 or the second pane of glass 3 receives such impact force is very little from temporal view in general daily life (including life time in work place or the like outside home). Therefore, the heat transmission as a result of the first pane of glass 2 and the second pane of glass 3 being bent so that the second spacers 7 comes into contact with the both of them hardly causes reduction in the thermal insulation efficiency of the glass panel unit 1.

In the first embodiment, each of the second spacers 7 is composed of an elastic body as stated above. This enables the second spacers 7 to efficiently absorb the shock caused by direct or indirect impact between the first pane of glass 2 and the second pane of glass 3. Material of the elastic body forming each second spacer 7 preferably has, but not particularly limited to, Young's modulus (modulus of longitudinal elasticity) that is, for example 3.4 [Pa].

In addition, each of the first spacers 6 may be composed of an elastic body.

In the first embodiment, each of the second spacers 7 is composed of a granular material, but the form thereof is not particularly limited. Examples of outline form of the granular material forming each second spacer 7 include, but not particularly limited to, various forms such as a spheroidal form, a rectangular hexagonal form such as a cubic form and a rectangular parallelepiped form, and a polyhedra form including a polyhedron. The granular material forming each second spacer 7 having any of the various outline forms may be solid or hollow. The granular material forming each second spacer 7 may be formed with a recess(es) or a hole(s) in an outer surface thereof.

The granular material forming each second spacer 7 as stated above may be formed by, but not particularly limited to, a spray-dry method or any of other methods.

Each of the second spacers 7 is not necessarily the granular material in the first embodiment, but may be made of fiber. Sectional form, sectional size, length and the like of the fiber forming each second spacer 7 are not particularly limited.

Each of the second spacers 7 is not necessarily the granular material in the first embodiment, but may be composed of a scale piece. Thickness, form, area and the like of the scale piece forming each second spacer 7 are not particularly limited.

The scale pieces forming the second spacers 7 stated above may be formed by dividing single-layer or multilayer film member into multiple members or formed of originally independent scale pieces, and the production method thereof is not particularly limited.

In the first embodiment, each of the second spacers 7 is 100 μm or less in maximum length. Each second spacer 7 has a longer maximum length, thereby being more visible to deteriorate the appearance thereof. From a view point of the appearance, preferably each second spacer 7 has a shorter maximum length because each second spacer 7 is hardly visible and the appearance is deteriorated. In the first embodiment, an upper limit of the maximum length of each second spacer 7 is 100 μm. Note that the maximum length of each second spacer 7 may exceed 100 μm and is not particularly limited.

In the first embodiment, the second spacers 7 are made from transparent material, but the optical transmittance of the transparent material is not particularly limited. The second spacers 7 may be made from opaque material, and the material of the second spacers 7 is not limited to being transparent or opaque.

When each of the second spacers 7 is 1 μm or less in maximum length, the appearance is good even when the second spacers 7 are opaque. However, when each of the second spacers 7 has such a short maximum length, the second spacers 7 cannot avoid direct impact between the bent first pane of glass 2 and the second pane of glass 3, or cannot sufficiently absorb the shock even if avoiding the direct impact. In either case, there is a concern that the second spacers 7 will not reduce the impact force caused by direct or indirect impact between the first pane of glass 2 and the second pane of glass 3. Thus, from a view point of shock absorption by the second spacers 7, each of the second spacers 7 preferably has a longer maximum length, and therefore a lower limit of the maximum length of the second spacers 7 may be, but not limited to, 10 μm, 1 μm or the like.

In the first embodiment, the second spacers 7 are regularly arranged. This case enables removal or reduction in distribution dispersion of the second spacers 7, thereby reducing dispersion of the impact resistance of the glass panel unit 1 to stabilize the impact resistance.

Similarly, the first spacers 6 are regularly arranged, thereby reducing dispersion of the impact resistance of the glass panel unit 1 to stabilize the impact resistance.

The second spacers 7 may be irregularly arranged. When the second spacers 7 are irregularly arranged, a film of, for example polyimide or the like may be crushed and dispersed at random, thereby forming the glass panel unit 1. The second spacers 7 may be irregularly arranged by any one of other production methods. Thus, arranging the second spacers 7 irregularly enables easy production and the omission of time-consuming process, thereby reducing production cost when compared with the second spacers 7 regularly arranged.

Similarly, arranging the first spacers 6 irregularly enables easy production and the omission of time-consuming process because in the production process the first spacers 6 needn't be arranged regularly. Accordingly, the production cost is reduced.

In the first embodiment, the material of each second spacer 7 has a softening point higher than a softening point of the thermal bonding material 40, but may have a softening point lower than the softening point of the thermal bonding material 40. Similarly, the material of each first spacer 6 may have a softening point lower than the softening point of the thermal bonding material 40.

Each first spacer 6 may be made from resin. The first spacers 6 made from resin allow the first pane of glass 2 and the second pane of glass 3 to easily approach each other when compared with general metallic first spacers 6. In this case, the second spacers 7 are provided, thereby enabling the glass panel unit 1 to have high impact resistance as a remarkable effect.

Each of the first spacers 6 may be made of metal. Examples of the metal may include preferably steel material or iron material such as stainless steel (SUS), but may include any of other metal or alloy. In addition, the surface of SUS may be coated with inorganic material such as molybdenum disulfide.

Each of the second spacers 7 may be made from resin. The elastic force of the resin enables suppression of contact between the first pane of glass 2 and the second pane of glass 3 on impact and prevents the first pane of glass 2 from being damaged even when the first pane of glass 2 and the second pane of glass 3 strongly come into contact with each other.

Each of the second spacers 7 may be made of metal. It is accordingly possible to reduce gas emission from the second spacers 7 even if amount of the second spacers 7 is increased when compared with the second spacers 7 each made from material such as synthetic resin as a gas emission source.

Each of the second spacers 7 may be made of graphite. This prevents the first pane of glass 2 from being damaged even when the first pane of glass 2 and the second spacers 7 strongly come into contact with each other on impact because friction damage between glass and the second spacers 7 is suppressed.

Each of the second spacers 7 may be made from polyimide. Polyimide is material having high heat resistance among resins, and is therefore able to resist heat process during vacuum glass production in addition to obtaining an effect as a resin elastic body from a view point of the impact resistance.

Each of the second spacers 7 may be made from polyamide. The polyamide is material having high heat resistance among resins, and is therefore able to resist heat process during vacuum glass production in addition to obtaining an effect as a resin elastic body from a view point of the impact resistance.

Each of the first pane of glass 2 and the second pane of glass 3 is rectangular in shape in the first embodiment, but is not particularly limited to the rectangular shape. Each of the first pane of glass 2 and the second pane of glass 3 is a flat plate having a plane in the first embodiment, but may have unevenness or curved surfaces.

The respective outlines of the first pane of glass 2 and the second pane of glass 3 accord with each other as viewed along the direction perpendicular to the pane surface in the first embodiment, but need not necessarily accord with each other.

Each of the first pane of glass 2 and the second pane of glass 3 may include wires. That is, wires made of material such as metal other than glass may be embedded in each of the first plate glass 20 and the second plate glass 30. Each of the first pane of glass 2 and the second pane of glass 3 may also include a member made of material such as metal other than glass.

The first pane of glass 2 includes the coating 21 in the first embodiment, but need not necessarily include the coating 21.

The second pane of glass 3 does not include such a coating 21 in the first embodiment, but may include such the coating 21.

The glass panel unit 1 includes the gas adsorbent 5 in the first embodiment, but need not necessarily include the gas adsorbent.

Figure 9:
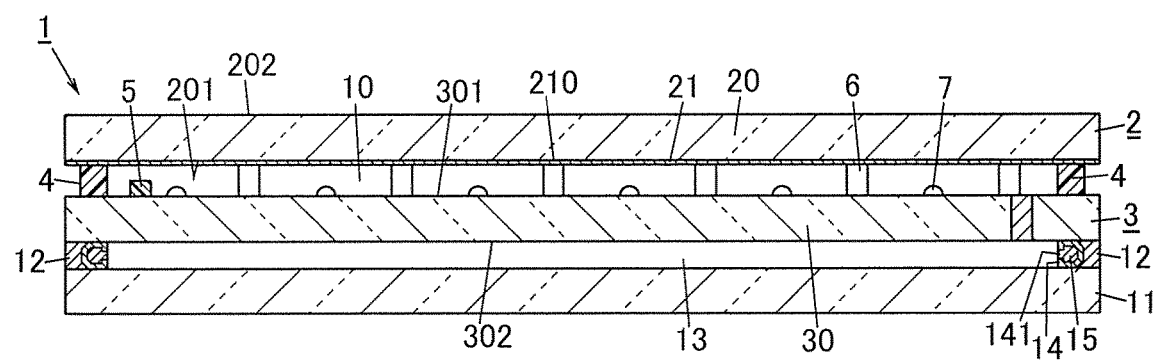
FIG. 9 is a schematic sectional view of a glass panel unit according to a second embodiment of the present invention.

A second embodiment will be explained with reference to FIG. 9. Note that the second embodiment includes additional components besides components like the first embodiment. Like components are assigned the same reference numerals as depicted in the first embodiment, and different components will be mainly described.

A glass panel unit 1 according to the second embodiment includes a third pane of glass 11 that faces a second pane of glass 3.

The glass panel unit 1 includes a second sealant 12 that is disposed between the second pane of glass 3 and the third pane of glass 11 and joined to them in an airtight manner. Specifically, the second sealant 12 is annular in shape and disposed between a periphery of the second pane of glass 3 and a periphery of the third pane of glass 11. The second sealant 12 is made from thermal bonding material. The second sealant 12 may be made from, but not particularly limited to, thermal bonding material that is the same as or different from that of a sealant 4.

The glass panel unit 1 includes a second interior space 13 that is sealed with the second pane of glass 3, the third pane of glass 11 and the second sealant 12 and filled with dry gas. Examples of the dry gas include, but not particularly limited to, dry rare gas such as argon, and dry air and the like.

The glass panel unit 1 includes a hollow frame member 14 that is annular in shape and disposed inside the second sealant 12 between the periphery of the second pane of glass 3 and the periphery of the third pane of glass 11. The frame member 14 is formed with though holes 141 communicating with the second interior space 13, and a desiccant 15 such as, for example silica gel is housed therein.

Joining of the second pane of glass 3 and the third pane of glass 11 may be performed like joining of a first pane of glass 2 and the second pane of glass 3. Note that both the embodiments differ in that an interior space 10 encompassed with the first pane of glass 2, the second pane of glass 3 and the sealant 4 is a vacuum space, whereas the second interior space 13 is not a vacuum space because the dry gas is filled therein.

The second embodiment enables an improvement in thermal insulation efficiency of the glass panel unit 1.

Figure 10:
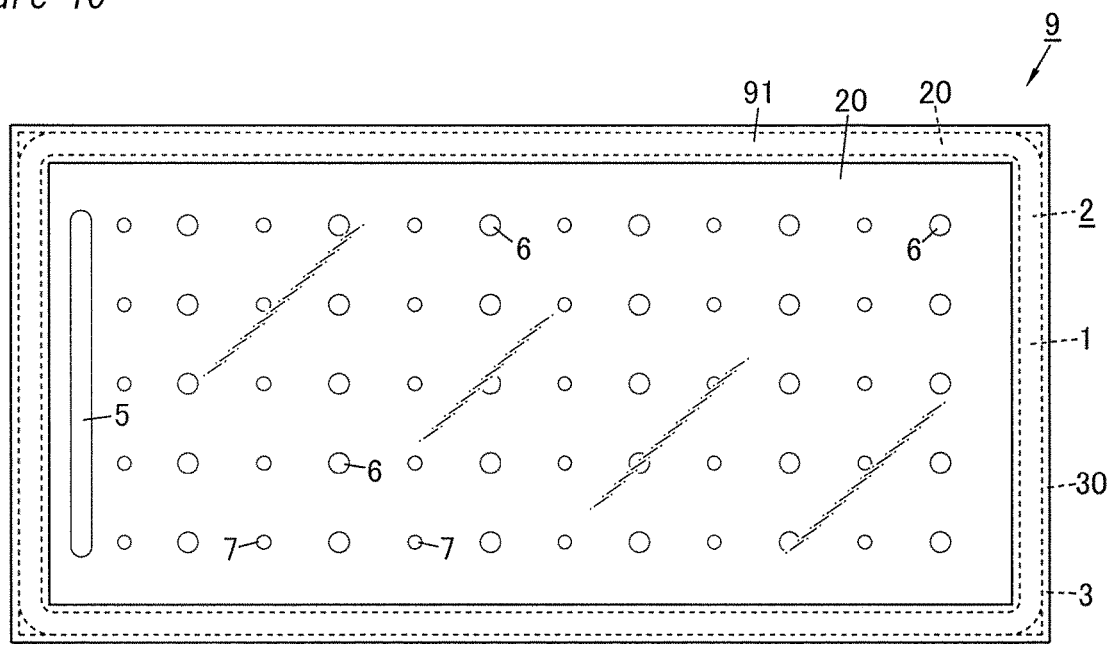
FIG. 10 is a schematic sectional view of a windowpane with the glass panel unit.

A third embodiment will be explained with reference to FIG. 10. Note that the third embodiment includes additional components besides components like the first embodiment or the second embodiment. Like components are assigned the same reference numerals as depicted in the first embodiment or the second embodiment, and different components will be mainly described.

The third embodiment is a windowpane 9 that includes a glass panel unit 1 in the same way as the first embodiment or the second embodiment, and is formed by fitting an outer periphery of the glass panel unit 1 into a window frame 91 having a U shaped cross section.

The third embodiment enables an improvement in thermal insulation efficiency of the windowpane 9.

As stated in the first to third embodiments, a glass panel unit 1 according to a first aspect includes a first pane of glass 2, and a second pane of glass 3 that faces the first pane of glass 2 with the first pane of glass 2 and the second pane of glass 3 spaced a predetermined interval apart. The glass panel unit 1 also includes a sealant 4 that is disposed between the first pane of glass 2 and the second pane of glass 3 and joined to the first pane of glass 2 and the second pane of glass 3 in an airtight manner, and an interior space 10 that is sealed with the first pane of glass 2, the second pane of glass 3 and the sealant 4. The glass panel unit 1 also includes a first spacer 6 that is disposed in the interior space 10 with the first spacer 6 in contact with the first pane of glass 2 and the second pane of glass 3. The glass panel unit 1 further includes a second spacer 7 that is disposed in the interior space 10 and that is in contact with only one of the first pane of glass 2 and the second pane of glass 3 and out of contact with another thereof.

The glass panel unit 1 according to the first aspect enables the second spacer 7 to suppress shock caused by direct or indirect impact between the first pane of glass 2 and the second pane of glass 3. As a result, the glass panel unit 1 is hardly broken. It is moreover possible to prevent heat from being transmitted between the first pane of glass 2 and the second pane of glass 3 via the second spacer 7 because the second spacer 7 is in contact with only one (second pane of glass 3) of the first pane of glass 2 and the second pane of glass 3 and out of contact with another thereof (first pane of glass 2), thereby preventing reduction in thermal insulation efficiency of the glass panel unit 1.

A glass panel unit 1 according to a second aspect is realized by combination with the first aspect. In the glass panel unit 1 according to the second aspect, the second spacer is 100 μm or less in maximum length.

The second aspect enables the glass panel unit 1 to have the second spacer 7 that is difficulty in visual recognition, thereby having a good appearance.

A glass panel unit 1 according to a third aspect is realized by combination with either the first aspect or the second aspect. In the glass panel unit 1 according to the third aspect, the second spacer 7 is composed of an elastic member.

The glass panel unit 1 according to the third aspect enables the second spacer 7 to efficiently absorb shock caused by direct or indirect impact between the first pane of glass 2 and the second pane of glass 3.

A glass panel unit 1 according to a fourth aspect is realized by combination with any one of the first to third aspects. In the glass panel unit 1 according to the fourth aspect, the second spacer 7 is made from transparent material.

The fourth aspect enables the glass panel unit 1 to have the second spacer 7 that is difficulty in visual recognition, hereby having a good appearance.

A glass panel unit 1 according to a fifth aspect is realized by combination with any one of the first to fourth aspects. The glass panel unit 1 according to the fifth aspect includes first spacers 6 and second spacers 7. As viewed along a direction perpendicular to a pane surface of the glass panel unit 1 (first surface 201, second surface 202, first surface 301, second surface 302), a ratio of a total area of the first spacers 6 to an area of the pane surface is greater than or equal to 0.05% and less than or equal to 0.2%. A ratio of a total area of the second spacers 7 to an area of the pane surface is greater than or equal to 0.05% and less than or equal to 0.2%.

With the glass panel unit 1 according to the fifth aspect, it is possible to efficiently improve the impact resistance of the glass panel unit 1.

A glass panel unit 1 according to a sixth aspect is realized by combination with the fifth aspect. In the glass panel unit 1 according to the sixth aspect, the ratio of the total area of the first spacers to the area of the pane surface is greater than or equal to 0.05% and less than or equal to 0.1%. The ratio of the total area of the second spacers to the area of the pane surface is greater than or equal to 0.15%.

With the glass panel unit 1 according to the sixth aspect, it is possible to efficiently improve the impact resistance of the glass panel unit 1.

A glass panel unit 1 according to a seventh aspect is realized by combination with the fifth aspect or the sixth aspect. In the glass panel unit 1 according to the sixth aspect, the second spacers 7 are arranged irregularly.

The glass panel unit 1 according to the sixth aspect facilitates producing the glass panel unit 1, thereby omitting time-consuming process during production of the glass panel unit 1 to reduce production cost.

A glass panel unit 1 according to an eighth aspect is realized by combination with the fifth to seventh aspects. In the glass panel unit 1 according to the sixth aspect, the first spacers 6 are arranged irregularly.

The eighth aspect facilitates producing the glass panel unit 1, thereby omitting time-consuming process during production of the glass panel unit 1 to reduce production cost.

A glass panel unit 1 according to a ninth aspect is realized by combination with any one of the first to eighth aspects. In the glass panel unit 1 according to the eighth aspect, a low-emissivity film 210 is formed on either the first pane of glass 2 or the second pane of glass 3, which the second spacer 7 is out of contact with.

The glass panel unit 1 according to the ninth aspect enables the second spacer 7 to hardly prevent the low-emissivity film from exhibiting performance thereof.

A glass panel unit 1 according to a tenth aspect is realized by combination with any one of the first to ninth aspects. The glass panel unit 1 according to the tenth aspect further includes a third pane of glass 11 facing the second pane of glass 3, a second sealant 12 that is disposed between the second pane of glass 3 and the third pane of glass 11 and joined to the second pane of glass 3 and the third pane of glass 11 in an airtight manner, and a second interior space 13 that is sealed with the second pane of glass 3, the third pane of glass 11 and the second sealant 12 and filled with dry gas.

The tenth aspect enables an improvement in thermal insulation efficiency of the glass panel unit 1.

A windowpane 9 according to a first aspect includes a glass panel unit 1 of any one of the first to tenth aspects, and a window frame 91 that a periphery of the glass panel unit 1 is fit in.

The first aspect enables a further improvement in thermal insulation efficiency of the windowpane 9.

REFERENCE SIGNS LIST

1 Glass panel unit
10 Interior space
2 First pane of glass
201 First surface
202 Second surface
210 Low-emissivity film
3 Second pane of glass
301 First surface
302 Second surface
4 Sealant
6 First spacer
7 Second spacer

The invention claimed is:
1. A glass panel unit, comprising:
  a first pane of glass;
  a second pane of glass that faces the first pane of glass with the first pane of glass and the second pane of glass spaced a predetermined interval apart;
  a sealant that is disposed between the first pane of glass and the second pane of glass and joined to the first pane of glass and the second pane of glass in an airtight manner;
  an interior space that is sealed with the first pane of glass, the second pane of glass and the sealant;
  a plurality of first spacers that are disposed in the interior space, the plurality of first spacers being in contact with the first pane of glass and the second pane of glass; and a plurality of second spacers that is disposed in the interior space, the plurality of second spacers being in contact with only the second pane of glass, out of contact with the first pane of glass, the plurality of second spacers being configured to be out of contact with the first pane of glass when the first pane of glass and the second pane of glass receive no force other than atmospheric pressure and to be in contact with the first pane of glass when the first pane of glass is bent, and one or more of the plurality of second spacers being arranged between two of the plurality of first spacers, respectively.

2. The glass panel unit of claim 1, wherein each of the plurality of second spacers is 100 µm or less in maximum length in a direction perpendicular to a pane surface of the glass panel unit.

3. The glass panel unit of claim 1, wherein each of the plurality of second spacers is composed of an elastic member.

4. The glass panel unit of claim 1, wherein each of the plurality of second spacers is made from transparent material.

5. The glass panel unit of claim 1, wherein as viewed along a direction perpendicular to a pane surface of the glass panel unit, a ratio of a total area of the plurality of first spacers to an area of the pane surface is greater than or equal to 0.05% and less than or equal to 0.2%, and a ratio of a total area of the plurality of second spacers to an area of the pane surface is greater than or equal to 0.05% and less than or equal to 0.2%.

6. The glass panel unit of claim 5, wherein the ratio of the total area of the plurality of first spacers to the area of the pane surface is greater than or equal to 0.05% and less than or equal to 0.1%, and the ratio of the total area of the plurality of second spacers to the area of the pane surface is greater than or equal to 0.15%.

7. The glass panel unit of claim 1, wherein the plurality of second spacers are arranged irregularly.

8. The glass panel unit of claim 1, wherein the plurality of first spacers are arranged irregularly.

9. The glass panel unit of claim 1, wherein a low-emissivity film is formed on the first pane of glass.

10. The glass panel unit of claim 1, further comprising:

a third pane of glass facing the second pane of glass;

a second sealant that is disposed between the second pane of glass and the third pane of glass and joined to the second pane of glass and the third pane of glass in an airtight manner; and a second interior space that is sealed with the second pane of glass, the third pane of glass and the second sealant and filled with dry gas.

11. A windowpane, comprising:

a glass panel unit of claim 1, and a window frame that a periphery of the glass panel unit is fit in.

12. The glass panel unit of claim 1, further comprising:

a third pane of glass facing the first pane of glass;

a second sealant that is disposed between the first pane of glass and the third pane of glass and joined to the first pane of glass and the third pane of glass in an airtight manner; and a second interior space that is sealed with the first pane of glass, the third pane of glass and the second sealant and filled with dry gas.

* * * * *